United States Patent

Norden

[15] 3,706,959
[45] Dec. 19, 1972

[54] GROUND CONNECTOR FOR CONDUIT

[72] Inventor: Alexander R. Norden, New York, N.Y.

[73] Assignee: O. Z. Electrical Manufacturing Company, Inc., New York, N.Y.

[22] Filed: April 8, 1971

[21] Appl. No.: 132,462

[52] U.S. Cl. ................................. 339/14 R, 339/251
[51] Int. Cl. .................................................. H01r 3/06
[58] Field of Search............ 339/14, 13, 95, 251, 272; 174/51

[56] References Cited

UNITED STATES PATENTS

| | | | |
|---|---|---|---|
| 1,054,227 | 2/1913 | McKenna | 339/251 |
| 3,365,693 | 1/1968 | Browne | 339/14 L |
| 3,492,625 | 1/1970 | Bromberg | 339/14 R |

FOREIGN PATENTS OR APPLICATIONS

| | | | |
|---|---|---|---|
| 1,110,574 | 4/1968 | Great Britain | 339/14 L |

Primary Examiner—Robert L. Wolfe
Assistant Examiner—Robert A. Hafer
Attorney—Harold S. Wynn and John P. DeLuca

[57] ABSTRACT

A grounding device is disclosed wherein a bushing is adapted to be threaded onto an end of conduit extending through a wall of a housing and a grounding lug is secured on the periphery of the bushing. The lug has a resilient C-shaped wire clamping portion and resilient wings extending from opposite ends thereof formed so as to provide spring tensioned connections to the periphery of the bushing. The wings have teeth adapted to make grounding connections with the wall of an enclosure or box upon threading of the bushing onto conduit extending through the enclosure, additionally providing anti-turning means to prevent the lug from rotating on its mounting screw.

9 Claims, 4 Drawing Figures

PATENTED DEC 19 1972  3,706,959

GROUND CONNECTOR FOR CONDUIT

While this invention is subject to a wide range of applications, it is especially suited for use in a grounding device for conduit, and it will be particularly described in this connection.

Grounding lugs for conduit fittings such as disclosed in the prior Browne U.S. Pat. No. 3,365,693, issued Jan. 23, 1968, are provided primarily for facilitating the grounding of conduit through a conduit bushing threaded onto the end of conduit, as at a service box, where the conduit passes through a wall of the box. Lugs of this type are generally adapted to be secured by a single screw to the periphery of the conduit bushing, and are adapted to receive a ground wire, preferably without requiring the wire to be cut. A clamping screw is provided for securing the wire within the lug. Heavy ground current can flow through the lug under abnormal conditions, as because of phase to ground faults and the like, and thus it is important that the lug provide a low resistance connection from the conduit and service box to a substantially heavy ground wire.

One of the problems encountered with connectors of this type is that the lug may be loosened in insertion and tightening of the ground wire due to rotation of the lug in relation to the bushing. Such turning can also be caused in certain types of bushings having a ground screw at one side of the lug when such ground screw is tightened against a wall of a housing. The tightening of such screw has a tendency to rotate the lug and thus loosen the screw fastening the lug to the periphery of a bushing, resulting in a poor connection between the lug and the bushing.

It has also been found that a loose connection can develop within the lug due to initial cold flow of the wire conductor material caused by plastic yielding of the metal under pressure applied by the clamping screw used to secure the wire within the lug. This problem is accentuated by thermal expansion of the conductor in an unyielding lug body, upon passage of high short-circuit current; the deformation of the conductor then results in a poor connection upon cooling of the two.

An object of the present invention is to provide an improved ground device for a conduit which substantially obviates the disadvantages of the described prior arrangements.

Another object of the present invention is to provide an improved ground device for conduit wherein a grounding lug is positively prevented from rotating relative to its associated bushing.

Another object of the present invention is to provide a grounding device for conduit having spring loaded contacting portions for ensuring maintenance of low resistance connections.

SUMMARY OF INVENTION

A grounding device is provided for conduit comprising a bushing adapted to be threaded onto an end of conduit extending through a wall of an enclosure, and a grounding lug secured to the periphery of the bushing. The lug has resilient wings extending from opposite sides of the wire clamping portion of the connector and formed backwards from the wire retaining portion, so as to provide spring tensioned connections to the periphery of the bushing at points adjoining both ends of the wings of the lug when the lug is secured to the bushing. The wings have teeth formed therein adapted to make grounding connections with a wall for an enclosure upon threading of the bushing onto conduit extending through such wall.

For a better understanding of the present invention, together with other further objects thereof, reference is had to the following description taken in connection with the accompanying drawing while its scope will be pointed out in the appending claims.

Figure 1:
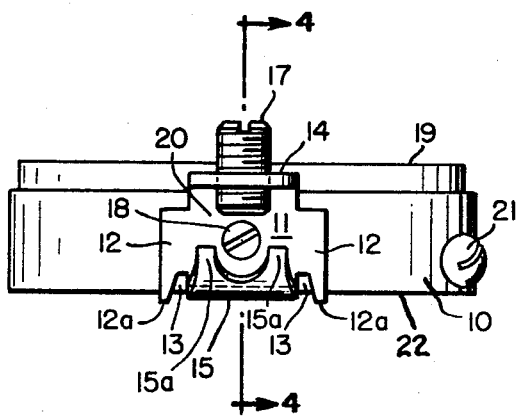
FIG. 1 is a front view of a grounding device showing the preferred embodiment of the present invention.
Figure 4:
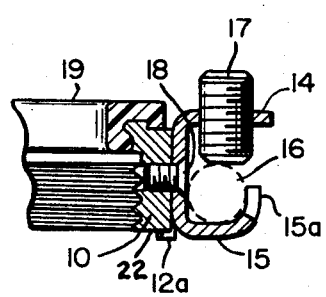
FIG. 4 is a sectional view of the ground device taken along the section line 4—4 of FIG. 1.

With reference to FIG. 1, a grounding device for conduit is illustrated comprising a bushing 10 adapted to be threaded onto an end of conduit extending through a wall of a housing. A grounding lug 11 is secured on the periphery of the bushing 10. The bushing 10 has a top annular surface protected with a molded plastic ring 19, and a bottom annular surface 22.

The lug has a back wall 20 which has a clearance hole in it for insertion of a mounting screw 18. Resilient wings 12 extend from opposite sides of the back wall 20 and are formed backward toward bushing 10 so as to provide spring tensioned connections to the periphery of the bushing 10 at points adjoining both ends of the wings 12 when the lug 11 is secured to the bushing 10 by screw 18. The wings 12 have teeth 12a. The teeth 12a extend somewhat past the edge of annular surface 22 of the bushing 10 and are adapted to make grounding connections with a wall of an enclosure upon threading the bushing onto conduit extending through such an enclosure. One tooth 12a is illustrated as extending from each of the wings 12.

The teeth 12a can be formed as by cutting a slot 13 in one side of each wing 12.

The lug 11 has flanged portions 14 and 15 at opposite sides of the backwall 20 for receiving a ground wire 16 between them. Flanged portion 15 is bifurcated into two ears 15a. A screw 17 is threaded into a tapped hole in flanged portion 14 for clamping a ground conductor 16 securely within the lug 11, confined by the backwall 20, flanged portion 15 and ears 15a.

The bifurcation of the flanged portion 15 into two ears 15A permits insertion of a screw 18 through the backwall 20 for fastening the lug 11 to the bushing 10.

Figure 3:
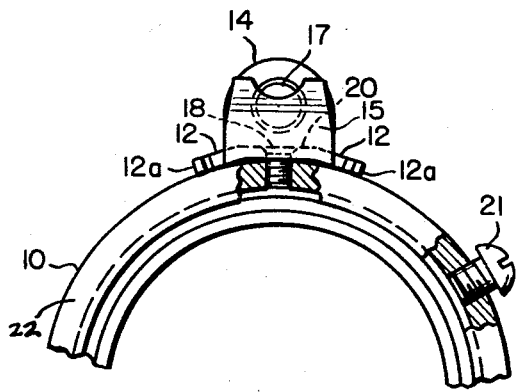
FIG. 3 is a view from the underside up shown partly in cross section of a grounding device according to the preferred embodiment shown in FIG. 1.
Figure 2:
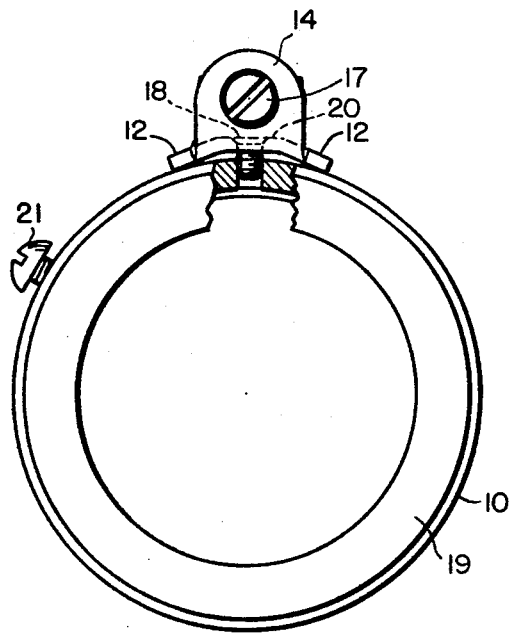
FIG. 2 is a view from top down, shown partly in cross section of a grounding device according to the preferred embodiment shown in FIG. 1.

The lug 11 may be formed as by stamping from metal of adequate mechanical strength and resilience, or may be formed of hardenable material such as annealed stainless steel alloy and then hardened to provide the desired resilience. The wings 12, which are formed backwardly from the wall 20 of the lug 11, are elastically distorted by tightening of mounting screw 18, and hence provide a spring loaded connection of the lug 11 to the bushing 10 as is illustrated in FIGS. 2 and 3. In FIG. 2, the lug 11 is shown loosely secured to the periphery of the bushing 10 by the screw 18 wherein only the outer edges of the wings 12 bear against the periphery of the bushing 10. When screw 18 is tightened, as illustrated in FIG. 3, the gap is substantially reduced or eliminated. Thus the tightening of the screw 18 spring loads the connection of the lug 11 to the periphery of the bushing 10 through the wings 12. Similarly, when the screw 17 is tightened against the ground conductor 16, the flanged portions 14 and 15 are sprung apart slightly by clamping thrust of the screw 17 so that the screw 17 is spring biased against the conductor 16. Thus if there is any initial cold flow in the wire 16 due to pressure applied by the screw 17, or thermal expansion or contraction of the conductor 16, the resilient action of the flanged portions 14 and 15 maintains pressure on wire 16 to compensate for the changes in conductor configuration caused by material flow. This maintains a tight contact.

When the assembly consisting of the bushing with the grounding lug 11 mounted is threaded onto the end of conduit inside of an enclosure, such as a service box, the teeth 12a both engage the wall through which the conduit passes to scrape paint or other foreign matter from the surface for providing a good connection, and in addition, these teeth, being on opposite ends of the lug 11, lock the lug 11 so that it cannot turn around the mounting screw 18 relative to the bushing 10. This is important because the subsequent insertion and clamping of a heavy ground connector within the lug could have a tendency to turn the lug 11 and the screw 18, and thus loosen connection of the lug 11 to the bushing 10 if this locking action were not provided. The teeth 12a may, if desired, be small enough so that they will spread somewhat upon tightening the bushing 10 and thus provide spring loaded contact connections against the wall of an enclosure.

The bushing 10 has a set screw 21 provided for tightening against threads of conduit to lock the bushing 10 against rotation.

A ground connecting device for conduit is therefore provided having spring loaded connection of the lug 11 to the bushing 10, spring loaded connection of a ground conductor 16 within the lug 11, and a connection of the lug 11 to a wall of a service enclosure which also locks the lug 11 against rotation relative to the bushing 10.

While there has been described what is at present considered to be the preferred embodiment of the invention, it will be obvious to those skilled in the art that various changes and modifications may be made therein, without departing from the invention, and it is therefore aimed in the appending claims to cover all such changes and modifications as fall within the true spirit and scope of the invention.

What is claimed is:

1. A grounding device for conduit comprising a bushing adapted to be threaded onto an end of conduit extending through a wall of an enclosure and a grounding lug secured on the periphery of the bushing wherein the improvement comprises;

a. resilient wings extending from opposite sides of the lug and being formed backwards from the lug so as to provide spring tensioned connections to the periphery of the bushing at points adjoining both ends of the wings when the lug is secured to the bushing, and wherein b. the wings have teeth formed thereon extending laterally from the bushing and adapted to make grounding connections with a wall of a housing upon threading the bushing onto conduit extending through the wall.

2. The grounding device according to claim 1 wherein there is at least one tooth on each wing.

3. A grounding device according to claim 2 wherein the teeth are formed by cutting a slot in one side of each wing.

4. A grounding device according to claim 1 wherein the lug has integral therewith upstanding flanges at opposite sides thereof for receiving a ground wire between the flanges, and a screw is threaded through an opening in one of the flanges for locking a ground conductor securely within the lug.

5. A grounding device according to claim 4 wherein the other of the flanges is bifurcated at the top and formed inwardly to retain a ground wire, the bifurcation permitting insertion of a screw in the base of the lug for fastening the lug to the bushing.

6. A grounding device according to claim 5 wherein the teeth are formed by cutting slots in one side of each wing.

7. A grounding device according to claim 6 wherein the lug is a stamping formed from resilient sheet metal whereby the resilient flanges can spring load the clamping of a wire within the lug, the wings provide a spring loaded connection of the lug to the bushing and the teeth can spring load connection to a wall of an enclosure and prevent turning of the lug relative to the bushing.

8. A grounding device adapted to be electrically connected to an electrical conducting surface wherein the improvement comprises:

a. a pair of resilient wings extending from opposite sides of said grounding device and formed so as to provide a spring tensioned and rotational inhibiting connection between said grounding device and said electrical conducting surface in response to the securing of said grounding device to said electrical conducting surface by a single fastening means; and wherein b. said wings of said grounding device are formed to substantially conform with the configuration of said electrical conducting surface subsequent to the securing of said grounding device to said electrical conducting surface.

9. A grounding device according to claim 8 wherein walls of said C-shaped portion of said grounding device are resilient to permit the spring loading of the set screw when it is tightened against the wire.

* * * * *